US005080149A

United States Patent [19]
Peoples

[11] Patent Number: 5,080,149
[45] Date of Patent: Jan. 14, 1992

[54] DUAL PURPOSE ENGINE OIL CONTAINER

[76] Inventor: Anthony L. Peoples, 1167 Longridge Dr., St. Louis, Mo. 63137

[21] Appl. No.: 497,646

[22] Filed: Mar. 23, 1990

[51] Int. Cl.$^5$ .............................................. B65B 39/02
[52] U.S. Cl. .................................... 141/337; 141/343; 141/98; 141/331; 215/1 C; 220/573; 184/105.1
[58] Field of Search .................. 141/98, 331, 332, 337, 141/338, 340–343, 363, 366; 215/1 C, 99.5; 220/1 C, DIG. 6, 85 F, 86 R; 206/223; 184/1.5, 105.1, 106

[56] References Cited

U.S. PATENT DOCUMENTS

| | | | |
|---|---|---|---|
| 181,618 | 8/1876 | Atterbury | 215/99.5 |
| 285,597 | 9/1883 | Eustis | 141/343 |
| 308,389 | 11/1884 | Snow | 141/343 |
| 589,659 | 9/1897 | Krack | 141/343 |
| 949,074 | 2/1910 | Hickox | 141/343 |
| 1,225,610 | 5/1917 | Garner | 141/343 |
| 4,114,660 | 9/1978 | Arruda | 141/98 |
| 4,157,103 | 6/1979 | LaFleur | 141/98 |
| 4,557,395 | 12/1985 | DeLay, Jr. | 220/86 R |
| 4,600,125 | 7/1986 | Maynard, Jr. | 141/331 X |
| 4,706,719 | 11/1987 | Eversdijk | 141/98 |

FOREIGN PATENT DOCUMENTS

| | | | |
|---|---|---|---|
| 1109185 | 1/1956 | France | 141/331 |
| 2114530 | 8/1983 | United Kingdom | 184/105.1 |

Primary Examiner—Henry J. Recla
Assistant Examiner—Casey Jacyna
Attorney, Agent, or Firm—Veo Peoples, Jr.

[57] ABSTRACT

A collapsible and disposable container for engine oil which can package fresh engine oil for dispensing into internal combustion engines, or alternatively can be employed for catching, holding and storing engine oil drained from an internal combustion engine when it is desired to change the oil.

1 Claim, 1 Drawing Sheet

DUAL PURPOSE ENGINE OIL CONTAINER

BACKGROUND OF THE INVENTION

1. Field of the Invention

This invention relates generally to engine oil containers for packaging unused engine oil, and more particularly to a dual purpose container which is collapsible and disposable and can be used for both packaging fresh engine oil and for catching and disposing used engine oil.

2. Description of Related Art

Although engine oil has been provided in disposable packaging, which has enabled one to conventionally dispense the engine oil into manifold openings of internal combustion engines, one must normally use altogether different containers for catching old and used engine oil when changing the oil from the engine. Additionally, for many applications, it is necessary to obtain a funnel in order not to lose or waste engine oil when adding it to the engine.

There are no single commercially available practical packages which can accomplish all of these functions.

The present invention uses a disposable, collapsible collection device which is designed to also package the original fresh engine oil. The preferred form of this device is an accordion shaped cylindrical container, having attached to it, by way of a smaller cylindrical neck, a very wide circular opening for receiving oil dispensed from an engine. This opening also has a funnel shaped top which can be employed to assist in dispensing fresh engine oil into the engine. Alternatively, a flat cap is available for closing the container and disposing of it in the event that the container is used to capture used engine oil.

It is therefore an object of this invention to provide a disposable container for catching used engine oil which container can be collapsed so that it can be secured between the junction of the engine and the transmission housing for collecting and holding the old oil.

It is a further object of this invention to provide such a disposable container as a means for packaging fresh engine oil and dispensing that oil into an internal combustion engine.

In accordance with these and other objects, which will become apparent hereafter, the instant invention will now be described with reference to the accompanying drawings.

DETAIL DESCRIPTION OF THE INVENTION

Figure 1:
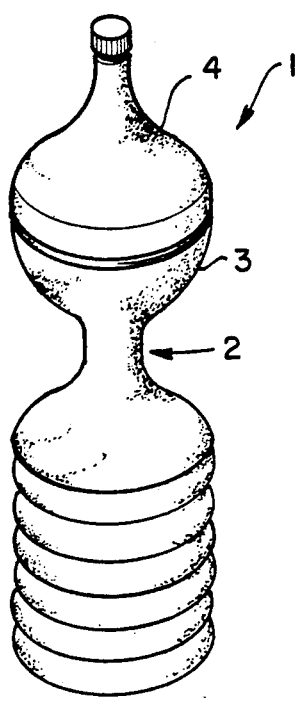
FIG. 1 is an isometric representation of one embodiment of the container in accordance with the invention.
Figure 2:
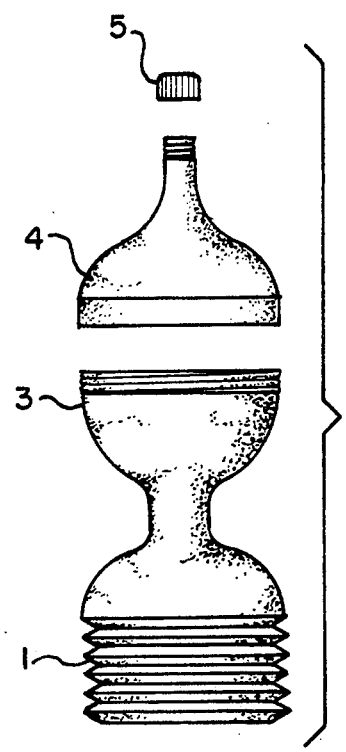
FIG. 2 is a side view of the container of FIG. 1, having its funnel cap and a smaller cap alligned with the container but unattached.
Figure 3:
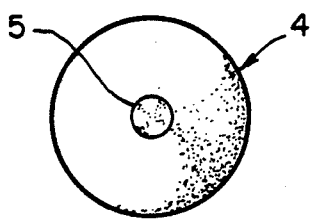
FIG. 3 is a top planned view of FIG. 1.
Figure 4:
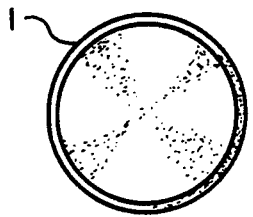
FIG. 4 is a bottom view of the container of FIG. 1.
Figures 5, 6:
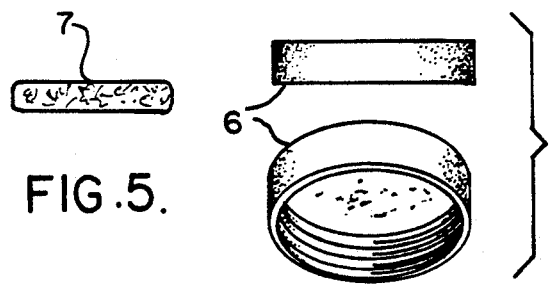
FIG. 5 is a side view of a package of particulate or porous filling material for absorbing the engine oil and said material maybe added to the container of FIG. 1.
FIG. 6 is an isometric view of a large, flat, cap which is an alternative cap to use in place of the reverse funnel.

Referring to FIG. 1, an accordion shaped cylindrical portion (1) of the container is preferably impervious to oil. Integrally attached to that accordion shaped portion is a neck-in portion which joins it to a funnel shaped top portion (3) which forms the top opening of the container and is threaded at the opening for receiving a reverse funnel cap (4) which has a smaller opening at its top end which is also threaded. Additionally, there is a top cap (5) which is threaded for enclosing the smaller portion of the reverse funnel (4). Referring to FIG. 6, there is a flat cap (6) which can be used to cover the opening at portion (3) of the container, and serves as an alternative to the reverse funnel (4).

Referring to FIG. 5, there is filling material (7) which maybe porous and is designed to be added to the container in order to retard movement of engine oil recovered after being used within the engine.

The container of the present invention is manufactured from oil impervious material, and is designed to commercially contain as much as four quarts of engine oil or as little as one quart of engine oil whichever is desired by the manufacturer.

When the container is employed to package fresh engine oil the reverse funnel (4) and the smaller cap (5) are added to the container once it is filled with the engine oil.

Consumers will be able to unscrew the cap (5) and place the opening within the manifold opening of an engine. The consumer can thereby pour the engine oil through the opening on portion 3 of the container into the reverse funnel (4) at its larger opening.

Thereafter once the engine oil must be changed, the same container but without reverse funnel (4) can be compressed or collapsed by pressure applied to it's accordion in (1) and placing it under the oil pan of the engine. Once the engine oil has been drained from the engine oil pan into the container of this invention the cap (6) maybe applied to the top of the container rather than using reverse funnel (4) and the entire container disposed of.

It is contemplated that natural porous material which can absorb engine oil such as that depicted in FIG. 5 can be added to the container prior to draining engine oil into it and thus will assist in retarding movement of the oil held within the container.

While the instant invention has been shown and description herein as what is conceived to be the most practical and preferred embodiment, it is recognized that departures maybe made therefrom within the scope of the invention, which is therefore not to be limited to the details disclosed herein, but it is to be afforded the full scope of the claims so as to embrace any and all equivalent apparatus.

What is claimed is:

1. A collapsible and disposable engine oil container for storing either fresh or used engine oil, said container comprising:

an accordion shaped cylindrical bottom section for collecting the substantial portion of engine oil to be stored in the container, a narrow necked-in portion above the accordion section of the container, said necked-in portion integrally connecting said accordion portion with the bottom narrower end of a first funnel shaped portion having a broader top end for receiving and/or collecting a portion of the engine oil, and having threads at said top end and a reverse funnel shaped top having a broader and a narrower end and having threads at each end connectable to the first funnel portion of the container by screwing the two broader ends together, said reverse funnel having at its narrower end an opening, and a small circular cap also having threads to be screwed onto the smaller end of said reverse funnel, wherein said reverse funnel can be employed to received fresh engine oil from the container and direct said oil into the engine of an automobile.

* * * * *